US012694828B2

(12) United States Patent
Kim et al.

(10) Patent No.: US 12,694,828 B2
(45) Date of Patent: Jul. 28, 2026

(54) PIXEL CIRCUIT HAVING A CAPACITOR STRUCTURE AND DISPLAY DEVICE INCLUDING THE SAME

(71) Applicant: LG Display Co., Ltd., Seoul (KR)

(72) Inventors: KangIl Kim, Seoul (KR); Seongkwang Kim, Goyang-si (KR); Seongku Lee, Seoul (KR); Kihyung Lee, Yongin-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/916,486

(22) Filed: Oct. 15, 2024

(65) Prior Publication Data

US 2025/0218364 A1 Jul. 3, 2025

(30) Foreign Application Priority Data

Dec. 28, 2023 (KR) ........................ 10-2023-0195717

(51) Int. Cl.
*G09G 3/32* (2016.01)
*G09G 3/3233* (2016.01)
(Continued)

(52) U.S. Cl.
CPC ............. *G09G 3/3233* (2013.01); *G09G 3/32* (2013.01); *G09G 3/2074* (2013.01); *G09G 3/3225* (2013.01); *G09G 3/3266* (2013.01); *G09G 2300/0426* (2013.01); *G09G 2300/0842* (2013.01)

(58) Field of Classification Search
CPC ...... G09G 3/32; G09G 3/3233; G09G 3/3266; G09G 3/3225; G09G 3/2074; G09G 2300/0426; G09G 2300/0842
See application file for complete search history.

(56) References Cited

U.S. PATENT DOCUMENTS 10,062,330 B2 8/2018 Han et al.
10,181,291 B2 1/2019 Han et al.
(Continued)

FOREIGN PATENT DOCUMENTS

KR 10-1702429 B1 2/2017
KR 10-2023-0034699 A 3/2023
(Continued)

*Primary Examiner* — Adam J Snyder
(74) *Attorney, Agent, or Firm* — Fenwick & West LLP

(57) ABSTRACT

A pixel circuit and a display device are disclosed. A display device may include a plurality of subpixels that each include: a light emitting element; a driving transistor configured to operate the light-emitting element by receiving a data voltage; a switching transistor configured to apply the data voltage to a gate electrode of the driving transistor; the light-emitting element including a cathode and an anode, the anode being connected to a source electrode of the driving transistor, the cathode being electrically connected to a low-potential voltage supply line, in which the low-potential voltage supply line supplies a low-potential voltage to the light-emitting element, and in which an intermediate electrode line that traverses a storage capacitor of the subpixels composes a first parasitic capacitor with the gate electrode of the driving transistor and composes a second parasitic capacitor with the source electrode of the driving transistor.

30 Claims, 8 Drawing Sheets

(51) Int. Cl.

| | |
|---|---|
| *G09G 3/20* | (2006.01) |
| *G09G 3/3225* | (2016.01) |
| *G09G 3/3266* | (2016.01) |

(56) References Cited

U.S. PATENT DOCUMENTS

| | | | | |
|---|---|---|---|---|
| 2009/0073092 | A1* | 3/2009 | Numao | G09G 3/3233 345/76 |
| 2009/0225011 | A1* | 9/2009 | Choi | G09G 3/3233 345/76 |
| 2012/0194576 | A1* | 8/2012 | Matsui | G09G 3/3258 345/77 |
| 2015/0130785 | A1* | 5/2015 | Shin | G09G 3/3233 345/82 |
| 2015/0170569 | A1 | 6/2015 | Han et al. | |
| 2018/0330670 | A1 | 11/2018 | Han et al. | |
| 2019/0066599 | A1* | 2/2019 | Kim | G09G 3/3266 |
| 2019/0096326 | A1* | 3/2019 | Yuan | G09G 3/3258 |
| 2019/0206971 | A1* | 7/2019 | Kim | G09G 3/3233 |
| 2021/0210001 | A1* | 7/2021 | Weng | G09G 3/2092 |
| 2021/0257581 | A1* | 8/2021 | Wang | H10K 59/122 |
| 2023/0070323 | A1 | 3/2023 | Yoon et al. | |
| 2023/0209952 | A1 | 6/2023 | Lee et al. | |
| 2024/0349535 | A1* | 10/2024 | Liu | H10K 59/124 |

FOREIGN PATENT DOCUMENTS

| | | | |
|---|---|---|---|
| KR | 10-2023-0034827 | A | 3/2023 |
| KR | 10-2023-0097620 | A | 7/2023 |

* cited by examiner

ACT(ACT1, ACT2, ACT3)
LS(LS1, LS2, LS3, LS4)
CLAD(CLAD1, CLAD2, CLAD3, CLAD4)
GSS(GSS1, GSS2)

PIXEL CIRCUIT HAVING A CAPACITOR STRUCTURE AND DISPLAY DEVICE INCLUDING THE SAME

CROSS-REFERENCE TO RELATED APPLICATION

This application claims the priority of Republic of Korea Patent Application No. 10-2023-0195717 filed on Dec. 28, 2023, which is hereby incorporated by reference in its entirety.

BACKGROUND

Field

The present disclosure relates to a display device.

Description of the Related Art

A display field for visually expressing electrical information signals has been rapidly developed as the information age has come in earnest. Therefore, various display devices, which are thin in thickness and light in weight and have excellent performances such as low power consumption, have been developed. Examples of the display devices may include a liquid crystal display (LCD) device, an organic light-emitting display (OLED) device, and the like.

The display device may include a drive circuit such as a data driver configured to supply data signals to a display panel on which pixel arrays for displaying an image are disposed and to data lines disposed on the display panel, a gate driver configured to sequentially supply gate signals to gate lines disposed in a display area, and a timing controller configured to control the data driver and the gate driver.

SUMMARY

An object to be achieved by the present disclosure is to provide a display device with a reduced channel length that increases because of a need for a low-current operation.

Objects of the present disclosure are not limited to the above-mentioned objects, and other objects, which are not mentioned above, can be clearly understood by those skilled in the art from the following descriptions.

In order to achieve the above-mentioned object, a display device according to an embodiment of the present disclosure may include a plurality of subpixels, in which the plurality of subpixels each includes: a light-emitting element; a driving transistor configured to operate the light-emitting element by receiving a data voltage; and a switching transistor configured to apply the data voltage to a gate electrode of the driving transistor; the light-emitting element including a cathode and an anode, the anode being connected to a source electrode of the driving transistor, the cathode being electrically connected to a low-potential voltage supply line, in which the low-potential voltage supply line supplies a low-potential voltage to the light-emitting element, and in which an intermediate electrode line that traverses a storage capacitor of the subpixels composes a first parasitic capacitor with the gate electrode of the driving transistor and composes a second parasitic capacitor with the source electrode of the driving transistor.

A pixel circuit according to an embodiment of the present disclosure may include a light-emitting element; a driving transistor configured to operate the light-emitting element by receiving a data voltage; and a switching transistor configured to apply the data voltage to a gate electrode of the driving transistor, wherein the light-emitting element comprises a cathode and an anode, wherein the anode is connected to a source electrode of the driving transistor, wherein the cathode is connected to a low-potential voltage supply line, wherein the low-potential voltage supply line supplies a low-potential voltage to the light-emitting element, and wherein an intermediate electrode line that traverses a storage capacitor composes a first parasitic capacitor with the gate electrode of the driving transistor and composes a second parasitic capacitor with the source electrode of the driving transistor.

Other detailed matters of the exemplary embodiments are included in the detailed description and the drawings.

According to the present disclosure, the channel length, which is increased by the need for the low-current operation, may be reduced, which may improve low-gradation FOS (front of screen) quality.

In addition, according to the present disclosure, the separate capacitor for inducing a boosting loss in the storage capacitor may be formed, which may induce the low-current operation and reduce the necessity of increasing the channel length of the driving transistor.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
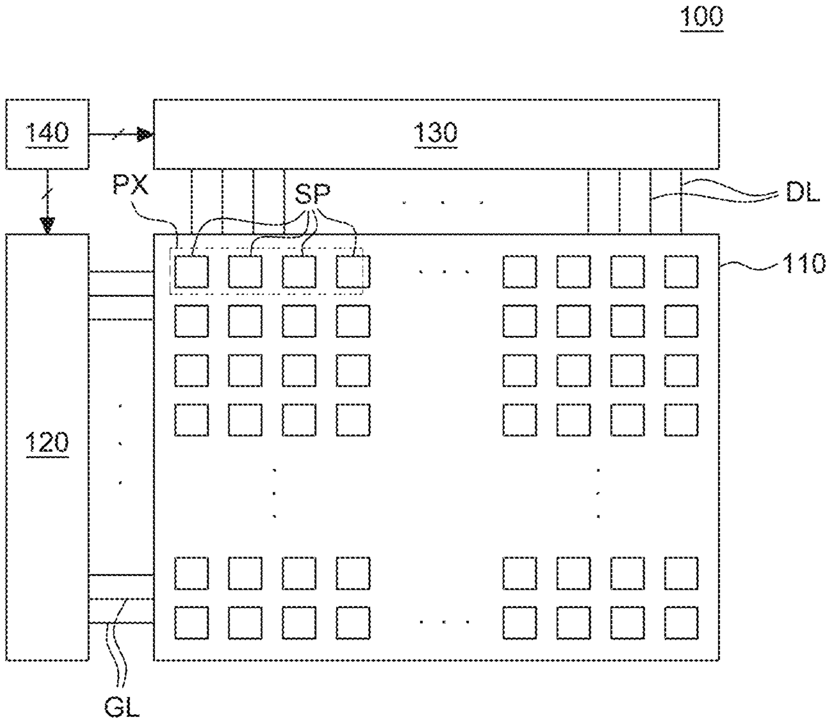
FIG. 1 is a block diagram illustrating a display device according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, it may be directly on the other element or layer, or another layer or another element may be interposed therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Same reference numerals generally denote same elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Transistors used for a display device according to embodiments of the present disclosure may be implemented as any one transistor among n-channel transistors (NMOS) and p-channel transistors (PMOS). The transistor may be implemented as an oxide semiconductor transistor having an active layer made of an oxide semiconductor or a low-temperature polysilicon (LTPS) transistor having an active layer made of low-temperature polysilicon (LTPS). The transistor may at least include a gate electrode, a source electrode, and a drain electrode. The transistor may be implemented as a thin-film transistor (TFT) on a display panel. In the transistor, carriers flow from the source electrode to the drain electrode. Because the carrier is the electron in the n-channel transistor (NMOS), a source voltage may be lower than a drain voltage so that the electrons flow from the source electrode to the drain electrode. In the n-channel transistor (NMOS), the current may flow from the drain electrode to the source electrode, and the source electrode may be an output terminal. Because the carrier is the positive hole in the p-channel transistor (PMOS), a source voltage may be higher than a drain voltage so that the positive holes flow from the source electrode to the drain electrode. Because the positive holes flow from the source electrode to the drain electrode in the p-channel transistor (PMOS), the current may flow from the source to the drain, and the drain electrode may be an output terminal. Therefore, it should be noted that the source and the drain of the transistor are not fixed because the source and the drain may be changed in accordance with an applied voltage. The present specification is described on the assumption that the transistor is the n-channel transistor (NMOS). However, the present disclosure is not limited thereto. The p-channel transistor may be used as the transistor. Therefore, the circuit configuration may be changed.

A gate signal of the transistors used as switch elements may swing between a gate-on voltage and a gate-off voltage. The gate-on voltage may be set to a voltage higher than a threshold voltage Vth of the transistor. The gate-off voltage may be set to a voltage lower than the threshold voltage Vth of the transistor. The transistor may be turned on in response to the gate-on voltage. In contrast, the transistor may be turned off in response to the gate-off voltage. In the case of the n-channel transistor (NMOS), the gate-on voltage may be a gate high voltage (VGH), and the gate-off voltage may be a gate low voltage (VGL). In the case of the p-channel transistor (PMOS), the gate-on voltage may be a gate low voltage (VGL), and the gate-off voltage may be a gate high voltage (VGH).

Hereinafter, various embodiments of the present disclosure will be described in detail with reference to the accompanying drawings.

FIG. 1 is a block diagram illustrating a display device according to an embodiment of the present disclosure.

With reference to FIG. 1, a display device 100 includes a display panel 110, a gate driver 120, a data driver 130, and a timing controller 140.

The display panel 110 is a panel configured to display images. The display panel 110 may include various circuits, lines, and light-emitting elements disposed on a substrate. The display panel 110 may include a plurality of pixels PX defined by a plurality of data lines DL and a plurality of gate lines GL that intersect one another. The plurality of pixels PX are connected to the plurality of data lines DL and the plurality of gate lines GL. The display panel 110 may include a display area defined by the plurality of pixels PX, and a non-display area in which various types of signal lines or various pads are formed. The display panel 110 may be implemented as the display panel 110 used for various display devices such as a liquid crystal display device, an organic light-emitting display device, and an electrophoretic display device. Hereinafter, the configuration will be described in which the display panel 110 is a panel used for an organic light-emitting display device. However, the present disclosure is not limited thereto.

The timing controller 140 receives timing signals such as a vertical synchronizing signal, a horizontal synchronizing signal, a data enable signal, and a dot clock signal through a receiving circuit such as an LVDS or TMDS interface connected to a host system. Based on the inputted timing signal, the timing controller 140 generates timing control signals for controlling the data driver 130 and the gate driver 120.

The data driver 130 supplies a data voltage DATA (see FIG. 2) to a plurality of subpixels SP. The data driver 130 may include a plurality of source drive integrated circuits (ICs). The plurality of source drive ICs may receive digital video data and source timing control signals from the timing controller 140. The plurality of source drive ICs may generate the data voltage DATA by converting the digital video data into gamma voltages in response to the source timing control signal and supply the data voltage DATA through the data lines DL of the display panel 110. The plurality of source drive ICs may be connected to the data lines DL of the display panel 110 by a chip-on-glass (COG) process or a tape automated bonding (TAB) process. In addition, the source drive ICs may be formed on the display panel 110 or a separate printed circuit board (PCB) substrate and connected to the display panel 110.

The gate driver 120 supplies gate signals to the plurality of subpixels SP. The gate driver 120 may include a level shifter and a shift register. The level shifter may shift a level of a clock signal inputted at a transistor-transistor-logic (TTL) level from the timing controller 140 and supply the shifted clock signal to the shift register. The shift register may be formed by a gate-in-panel (GIP) method in the non-display area of the display panel 110. However, the present specification is not limited thereto. The shift register may include a plurality of stages configured to shift the gate signal to correspond to the clock signal and the driving signal and output the gate signal. The plurality of stages included in the shift register may sequentially output the gate signals through a plurality of output terminals.

The display panel 110 may include the plurality of subpixels SP. The plurality of subpixels SP may be subpixels SP that emit light beams with different colors. For example, the plurality of subpixels SP may include a red subpixel, a green subpixel, a blue subpixel, and a white subpixel. However, the present disclosure is not limited thereto. The plurality of subpixels SP may constitute the pixel PX. A group of the plurality of subpixels may compose one pixel. That is, the red subpixel, the green subpixel, the blue subpixel, and the white subpixel may constitute a single pixel PX. The display panel 110 may include the plurality of pixels PX.

Hereinafter, the drive circuit for operating one subpixel SP will be described in more detail with reference to FIG. 2.

Figure 2:
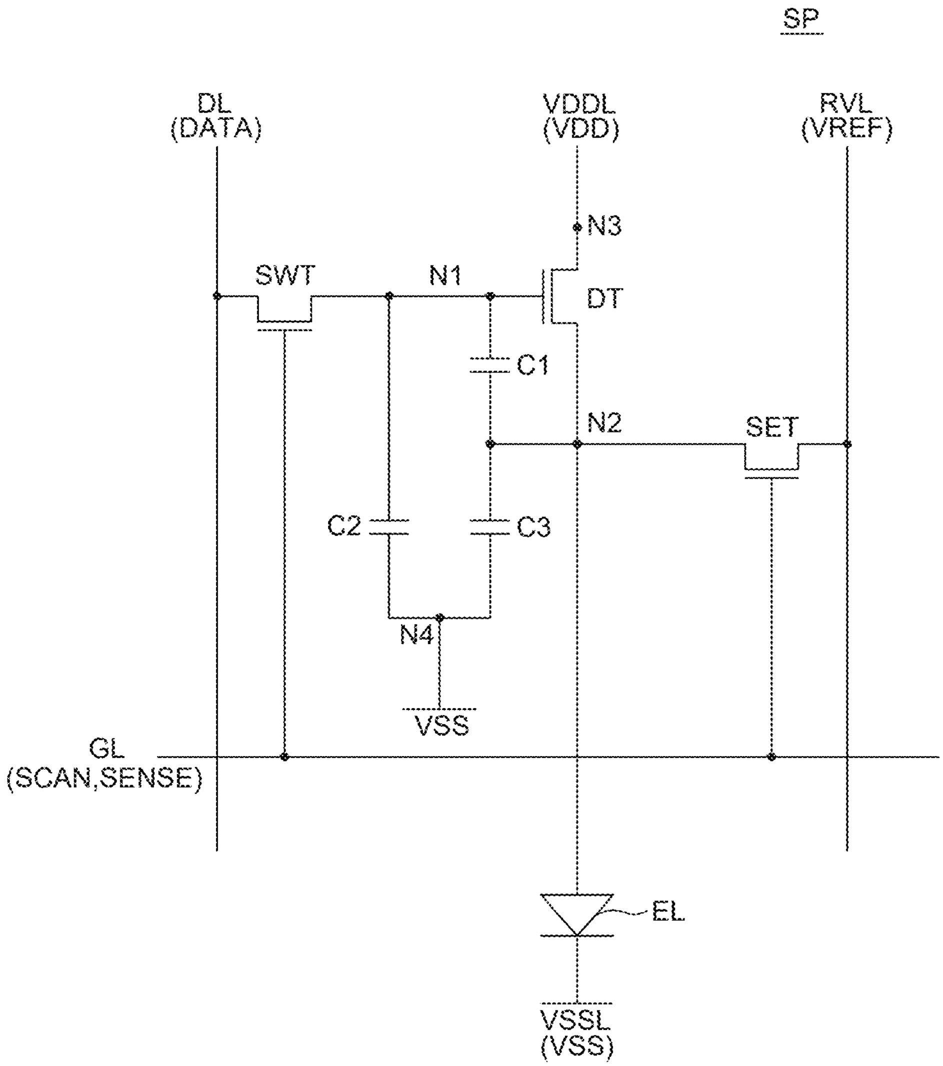
FIG. 2 is a circuit diagram of a subpixel of the display device according to an embodiment of the present disclosure.

FIG. 2 is a circuit diagram of the subpixel of the display device according to an embodiment of the present disclosure.

With reference to FIG. 2, the subpixel SP may include a switching transistor SWT, a sensing transistor SET, a driving transistor DT, and a light-emitting element EL.

The light-emitting element EL may include an anode, an organic layer, and a cathode. The organic layer may include various organic layers such as a hole injection layer, a hole transport layer, an organic light-emitting layer, an electron transport layer, and an electron injection layer. The anode of the light-emitting element EL may be connected to a source electrode that is an output terminal of the driving transistor DT, and a low-potential voltage VSS may be applied to the cathode. FIG. 2 illustrates that the light-emitting element EL is an organic light-emitting element EL. However, the present disclosure is not limited thereto. An inorganic light-emitting diode, i.e., an LED may also be used as the light-emitting element EL.

The switching transistor SWT is a transistor for transmitting the data voltage DATA to a first node N1 corresponding to the gate electrode of the driving transistor DT. The switching transistor SWT may include a drain electrode connected to the data line DL, a gate electrode connected to the gate line GL, and a source electrode connected to the gate electrode of the driving transistor DT. The switching transistor SWT may be turned on in response to a scan signal SCAN applied from the gate line GL and transmit the data voltage DATA, which is supplied from the data line DL, to the first node N1 corresponding to the gate electrode of the driving transistor DT.

The driving transistor DT is a transistor for operating the light-emitting element EL by supplying a drive current to the light-emitting element EL. The driving transistor DT may include a gate electrode corresponding to the first node N1, a source electrode corresponding to a second node N2 and an output terminal, and a drain electrode corresponding to a third node N3 and an input terminal. The gate electrode of the driving transistor DT may be connected to the switching transistor SWT. The drain electrode may receive a high-potential voltage VDD through a high-potential voltage supply line VDDL. The source electrode may be connected to the anode of the light-emitting element EL.

According to the embodiment of the present disclosure, the subpixel SP may include a plurality of capacitors connected to the driving transistor DT. The plurality of capacitors may include a first capacitor C1, a second capacitor C2, and a third capacitor C3.

The first capacitor C1 may be formed between the gate electrode and the source electrode of the driving transistor DT. In detail, the first capacitor C1 may be connected between the first node N1, which is connected to the gate electrode of the driving transistor DT, and the second node N2 connected to the source electrode of the driving transistor DT. The first capacitor C1 may be a storage capacitor positioned between the gate electrode and the source electrode of the driving transistor DT.

The second capacitor C2 may be formed between the first node N1, which is connected to the gate electrode of the driving transistor DT, and a fourth node N4 configured to receive the low-potential voltage VSS. The fourth node N4 may be specified by an intermediate electrode line SD (see FIG. 3). The intermediate electrode line SD may be connected to a low-potential voltage supply line VSSL and serve as the fourth node N4 in a storage capacitor area.

In addition, the third capacitor C3 may be formed between the second node N2, which is connected to the source electrode of the driving transistor DT, and the fourth node N4 configured to receive the low-potential voltage VSS.

According to the embodiment, the second capacitor C2 and the third capacitor C3 may be parasitic capacitors. One end of the second capacitor C2 and one end of the third capacitor C3 may be the intermediate electrode line SD. The other end of the second capacitor C2 may be one end of the first capacitor C1, and the other end of the third capacitor C3 may be the other end of the first capacitor C1 (see FIG. 4).

In the case of the display device 100, the driving transistor DT may be degraded as an operating time of each of the subpixels SP increases. Therefore, an inherent characteristic value of the driving transistor DT may change. In this case, the inherent characteristic values of the circuit element may include the threshold voltage Vth of the driving transistor DT, mobility a of the driving transistor DT, and the like. A change in characteristic value of the circuit element may cause a change in luminance of the corresponding subpixel SP. Therefore, the change in characteristic value of the circuit element may be used as the same concept as the change in luminance of the subpixel SP.

In addition, a degree of the change in characteristic values between the circuit elements of each of the subpixels SP may vary depending on a difference in degree of degradation between the circuit elements. A difference in degree of change in characteristic values between the circuit elements may cause a luminance deviation between the subpixels SP. Therefore, the deviation of characteristic values between the circuit element may be used as the same concept as the luminance deviation between the subpixels SP. The change in characteristic value of the circuit element, i.e., the deviation between the change in luminance of the subpixel SP and the characteristic values between the circuit elements, i.e., the luminance deviation between the subpixels SP may cause problems such as deterioration of accuracy of luminance expression of the subpixel SP or screen abnormality.

A sensing function of sensing the characteristic values of the subpixels SP and a compensation function of compensating for the characteristic value of the subpixel SP by using the sensing result may be provided to the subpixels SP of the display device 100 according to the embodiment of the present disclosure.

With reference to FIG. 2, in addition to the switching transistor SWT, the driving transistor DT, and the light-emitting element EL, the subpixel SP may further include the sensing transistor SET for effectively controlling a voltage state of the source electrode of the driving transistor DT.

The sensing transistor SET may be connected between the source electrode of the driving transistor DT and a reference voltage line RVL configured to supply a reference voltage VREF, and the gate electrode is connected to the gate line GL. Therefore, the sensing transistor SET may be turned on in response to a sensing signal SENSE applied through the gate line GL and apply the reference voltage VREF, which is supplied through the reference voltage line RVL, to the source electrode of the driving transistor DT. In addition, the sensing transistor SET may be used as one of the voltage sensing paths for the source electrode of the driving transistor DT.

According to the embodiment, the switching transistor SWT and the sensing transistor SET of the subpixel SP may share the single gate line GL. That is, the switching transistor SWT and the sensing transistor SET may be connected to the same gate line GL and receive the same gate signal (e.g., the scan signal SCAN or the sensing signal SENSE). However, for the convenience of description, the voltage applied to the gate electrode of the switching transistor SWT is referred to as the scan signal SCAN, and the voltage applied to the gate electrode of the sensing transistor SET is referred to as the sensing signal SENSE. However, the scan signal SCAN and the sensing signal SENSE, which are applied to the single subpixel SP, are identical signals transmitted from the same gate line GL.

According to another embodiment, the switching transistor SWT may be connected to the gate line GL, and the sensing transistor SET may be connected to a separate sensing line (not illustrated). The scan signal SCAN may be applied to the switching transistor SWT through the gate line GL. The sensing signal SENSE may be applied to the sensing transistor SET through the sensing line.

The reference voltage VREF is applied to the source electrode of the driving transistor DT through the sensing transistor SET. The voltage for sensing the threshold voltage Vth of the driving transistor DT or the mobility a of the driving transistor DT is detected through the reference voltage line RVL. The data driver 130 (the data driver 130 in FIG. 1) may compensate for the data voltage DATA depending on the amount of detected change in threshold voltage Vth of the driving transistor DT or the amount of detected change in mobility a of the driving transistor DT.

Figure 3:
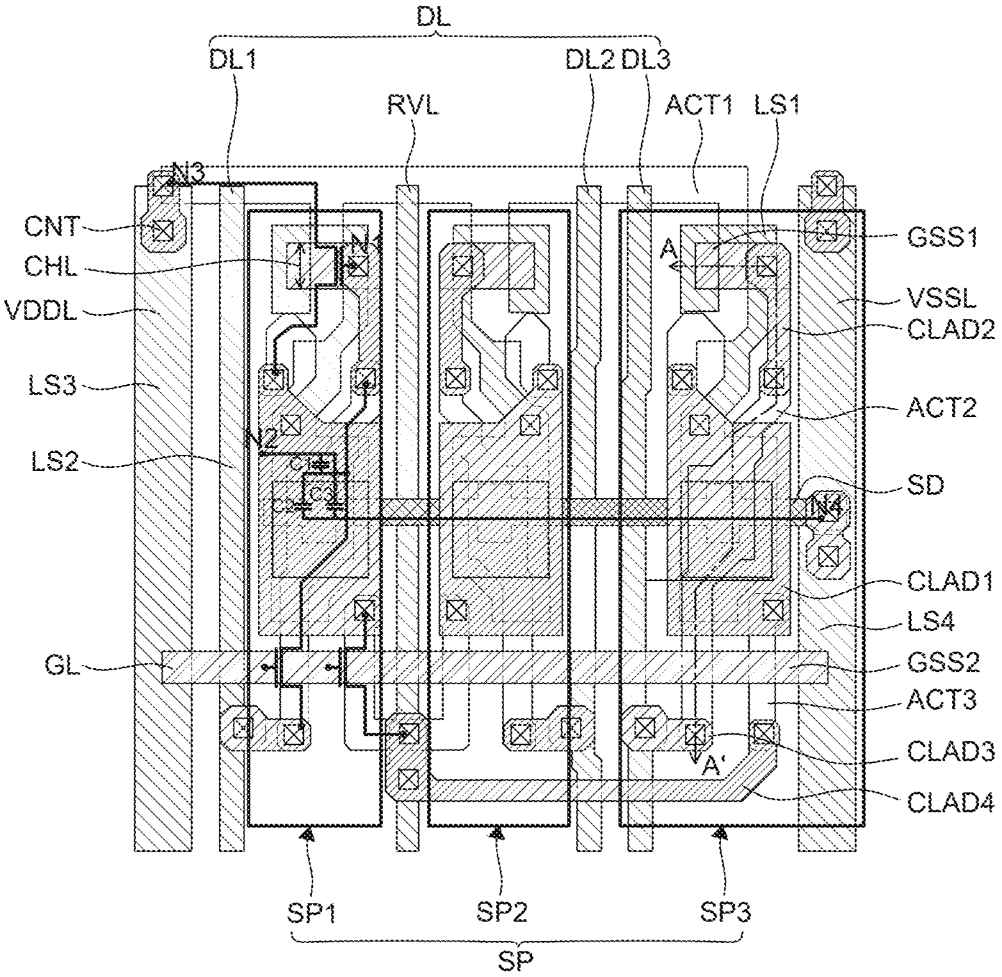
FIG. 3 is a view schematically illustrating a planar structure of the display device according to an embodiment of the present disclosure.

FIG. 3 is a view schematically illustrating a planar structure of the display device according to an embodiment of the present disclosure.

Figure 4:
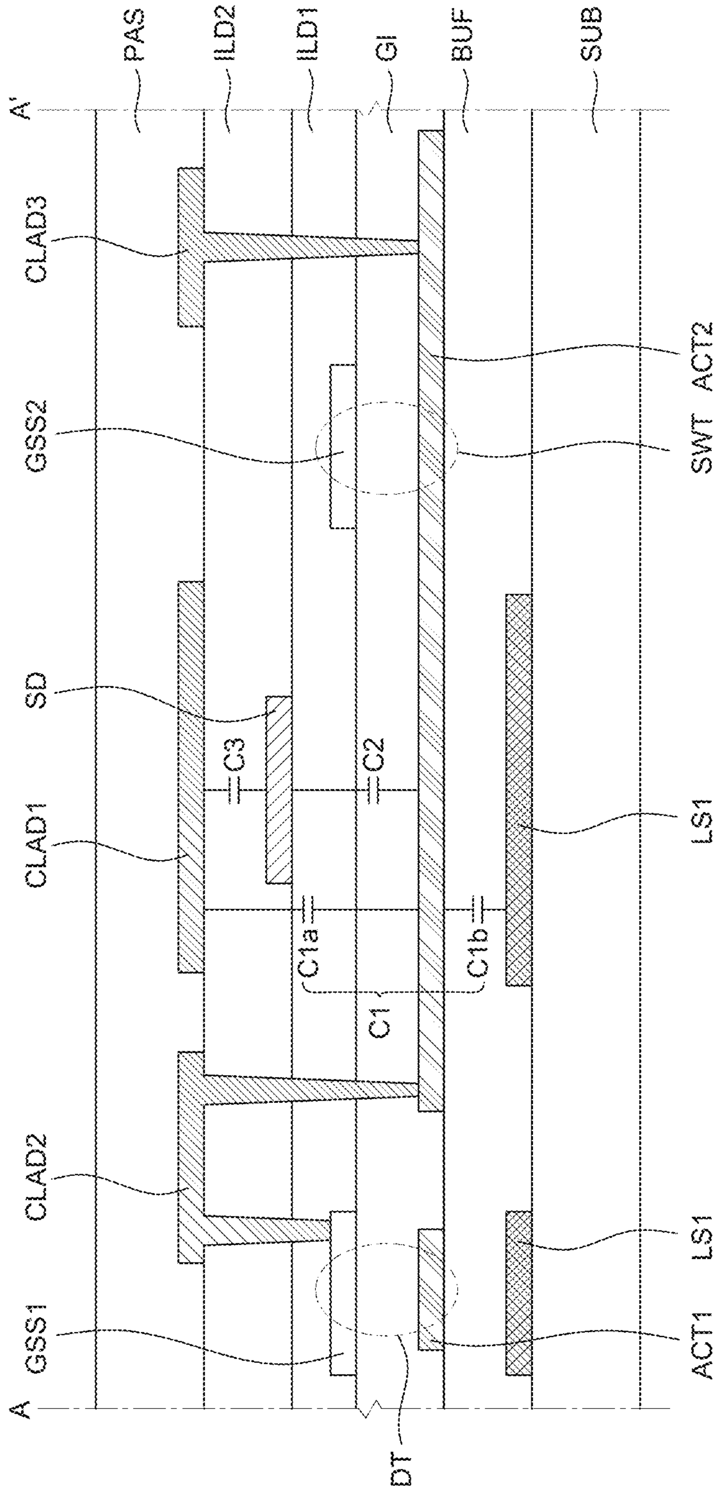
FIG. 4 is a view illustrating a cross-section taken along line A-A' in FIG. 3 an embodiment of the present disclosure.

FIG. 4 is a view illustrating a cross-section taken along line A-A' in FIG. 3 according to an embodiment of the present disclosure.

FIG. 3 illustrates that one subpixel has a 3T3C structure including the switching transistor SWT, the driving transistor DT, the sensing transistor SET, and the plurality of capacitors C1, C2, and C3. However, according to the embodiment of the present disclosure, a transistor for supporting an additional initialization operation or internal/external compensation may be further provided. Further, FIG. 3 exemplarily illustrates planar structures of three subpixels. In addition, FIG. 4 illustrates, as an example, cross-sectional structures of the plurality of capacitors C1, C2, and C3 of the display device according to an embodiment of the present disclosure illustrated in FIG. 3.

With reference to FIG. 3, the pixel may include the plurality of subpixels in the display device according to the embodiment of the present disclosure. The plurality of subpixels may include the high-potential voltage supply line VDDL, the low-potential voltage supply line VSSL, the reference voltage line RVL, the gate line GL, and the data line DL. The plurality of subpixels may include the plurality of capacitors C1, C2, and C3, the plurality of transistors (e.g., the driving transistor DT, switch transistor SWT, and the sensing transistor SET), and the light-emitting element EL described above with reference to FIG. 2. For convenience of description, FIG. 3 does not illustrate components corresponding to the light-emitting element EL.

With reference to FIG. 3, first to third subpixels SP1, SP2, and SP3 may receive the data voltage DATA from first to third data lines DL1, DL2, and DL3 and receive at least one of the scan signal SCAN and the sensing signal SENSE from the gate line GL. The scan signal SCAN and the sensing signal SENSE may be supplied to the switching transistor SWT and the sensing transistor SET by the single gate line GL respectively corresponding to the scan signal SCAN and the sensing signal SENSE. However, the scan signal SCAN and the sensing signal SENSE may be individually supplied by two separate lines (e.g., the gate line and the sensing line).

The first to third data lines DL1, DL2, and DL3 may be disposed substantially in parallel with the reference voltage line RVL, the high-potential voltage supply line VDDL, and the low-potential voltage supply line VSSL. The first to third data lines DL1, DL2, and DL3 may intersect the gate line GL while defining a predetermined angle (e.g., a right angle or an acute angle of 90 degrees or less). The pixel area of the subpixels may be defined by the first to third data lines DL1, DL2, and DL3 and the gate line GL that intersect one another.

The reference voltage line RVL may be disposed between a first subpixel SP1 and a second subpixel SP2. The reference voltage line RVL may be disposed between the first subpixel SP1 and the second subpixel SP2 and supply the reference voltage VREF to the sensing transistors SET of the first and second subpixels SP1 and SP2.

Unlike the first subpixel SP1 and the second subpixel SP2, a third subpixel SP3 is disposed to be distant from the reference voltage line RVL by a dimension of one subpixel. Therefore, the reference voltage line RVL may supply the reference voltage VREF to the sensing transistor SET of the third subpixel SP3 through a bridge line.

Because the reference voltage line RVL is disposed between the first subpixel SP1 and the second subpixel SP2, a first data line DL1 for the first subpixel SP1 may be disposed at a left side of the first subpixel SP1, and a second data line DL2 for the second subpixel SP2 may be disposed at a right side of the second subpixel SP2. In other words, the first subpixel SP1 may be disposed between the first data line DL1 and the reference voltage line RVL, and the second subpixel SP2 may be disposed between the second data line DL2 and the reference voltage line RVL.

The third subpixel SP3 may be disposed between a third data line DL3 and the low-potential voltage supply line VSSL. Therefore, the second data line DL2 and the third data line DL3 are disposed between the third subpixel SP3 and the second subpixel SP2. The third subpixel SP3 and the first subpixel SP1 may be formed to have substantially the same pattern, and the third subpixel SP3 and the second subpixel SP2 may be formed to have patterns facing each other in a substantially mirror-like manner. Therefore, substantially the same or similar to the first subpixel SP1, the third data line DL3 is formed at the left side of the third subpixel SP3 in order to efficiently supply the data voltage DATA to the third subpixel SP3.

In the display device according to the embodiment, the pixel may include the plurality of capacitors C1, C2, and C3. The plurality of capacitors may include the first capacitor C1, which corresponds to a storage capacitor, and the second capacitor C2 and the third capacitor C3 that correspond to parasitic capacitors. In the present disclosure, the first capacitor C1 may be referred to as a storage capacitor, the second capacitor C2 may be referred to as a first parasitic capacitor, and the third capacitor C3 may be referred to as a second parasitic capacitor.

As described below with reference to FIG. 4, the first capacitor C1 may include a first-first capacitor C1*a* formed between an active layer ACT and a third wiring layer CLAD, and a first-second capacitor C1*b* formed between the active layer ACT and a first wiring layer LS.

The second capacitor C2 may be formed between the intermediate electrode line SD and the active layer ACT. The second capacitor C2 may be formed between the intermediate electrode line SD and the gate electrode of the driving transistor DT. The third capacitor C3 may be formed between the intermediate electrode line SD and the source electrode of the driving transistor DT. The third capacitor C3 may be formed between the intermediate electrode line SD and the third wiring layer CLAD. The intermediate electrode line SD may traverse the storage capacitor in which the first capacitor C1 is formed, and the intermediate electrode line SD may define the second capacitor C2 and the third capacitor C3 with the active layer ACT and the third wiring layer CLAD in the storage capacitor area. To this end, the intermediate electrode line SD may be disposed substantially in parallel with the gate line GL.

In the display device according to the embodiment, the pixel may further include the intermediate electrode line SD.

The intermediate electrode line SD may be disposed substantially in parallel with the gate line GL and disposed from the low-potential voltage supply line VSSL so as not to intersect the high-potential voltage supply line VDDL. The intermediate electrode line SD may extend from the low-potential voltage supply line VSSL to the storage capacitor of the first subpixel SP1 while traversing the storage capacitor of the second and third subpixels SP2 and SP3.

In addition, the intermediate electrode line SD may be disposed to intersect the plurality of data lines DL. For example, the intermediate electrode line SD may be disposed to intersect the plurality of data lines DL1, DL2, and DL3 included in one pixel (including the first subpixel SP1, the second subpixel SP2, and the third subpixel SP3). In this case, the intermediate electrode line SD may be disposed to intersect the plurality of data lines DL1, DL2, and DL3 and the reference voltage line RVL included in one pixel.

The intermediate electrode line SD may be electrically connected to the low-potential voltage supply line VSSL. The intermediate electrode line SD may supply the low-potential voltage VSS to the light-emitting elements EL of the first to third subpixels SP1, SP2, and SP3.

Meanwhile, for convenience of description, the intermediate electrode line SD may be interchangeable with an intermediate electrode layer SD or may be disposed in the intermediate electrode layer.

With reference to FIGS. 3 and 4, the display device according to the embodiment of the present disclosure may include the first wiring layer LS, the active layer ACT, a second wiring layer GSS, the intermediate electrode layer SD, and the third wiring layer CLAD on a substrate SUB. The first wiring layer LS, the active layer ACT, the second wiring layer GSS, and the third wiring layer CLAD may be sequentially arranged on the substrate.

The first wiring layer LS may be a light-blocking layer and define a basic wiring structure for supplying current for operating the subpixel. The active layer ACT may constitute the plurality of transistors (e.g., the driving transistor DT, the sensing transistor SET, and the switching transistor SWT). The active later ACT may be a semiconductor layer for a plurality of transistors including the driving transistor DT. The second wiring layer GSS may constitute the gate electrode of each of the plurality of transistors (e.g., the driving transistor DT, the sensing transistor SET, and the switching transistor SWT). The intermediate electrode layer SD may be disposed between the active layer ACT and the third wiring layer CLAD and define the parasitic capacitors (e.g., C2 and C3) with the active layer ACT and the third wiring layer CLAD. The third wiring layer CLAD may electrically connect different wiring layers (e.g., the first wiring layer LS and the second wiring layer GSS), the intermediate electrode layer SD, and the active layer ACT through a plurality of contact holes.

The first wiring layer LS may be disposed on the substrate SUB. The first wiring layer LS disposed on the substrate SUB may define the high-potential voltage supply line VDDL, the low-potential voltage supply line VSSL, the data lines DL1, DL2, and DL3, and the reference voltage line RVL. The first wiring layer LS may be formed together with the high-potential voltage supply line VDDL, the low-potential voltage supply line VSSL, the data lines DL1, DL2, and DL3, and the reference voltage line RVL.

The first wiring layer LS may include a first-first wiring layer LS1, a first-second wiring layer LS2, a first-third wiring layer LS3, and a first-fourth wiring layer LS4. The first-first to first-fourth wiring layers LS1, LS2, LS3, and LS4 may be made of the same material. The first-first wiring layer LS1 may be disposed below the storage capacitor and the driving transistor DT. The first-second wiring layer LS2 may be the data lines DL1, DL2, and DL3. The first-third wiring layer LS3 may be the high-potential voltage supply line VDDL. The first-fourth wiring layer LS4 may be the low-potential voltage supply line VSSL.

A buffer layer BUF may be disposed on the first wiring layer LS. The buffer layer BUF may be disposed between the first wiring layer LS and the active layer ACT and separate the active layer ACT and the first wiring layer LS. The first wiring layer LS (e.g., the first-first wiring layer LS1) and the active layer ACT may define the first-second capacitor C1*b* with the buffer layer BUF interposed therebetween. In detail, the first-first wiring layer LS1 and the active layer ACT may define the first-second capacitor C1*b* in the area in which the first-first wiring layer LS1 and the active layer ACT face each other upward and downward. The first-second capacitor C1*b* may be configured as a part of the first capacitor C1 corresponding to the storage capacitor.

The active layer ACT may be disposed on the buffer layer BUF. The active layer ACT and the second wiring layer GSS may constitute the transistor. For example, the transistors may include the switching transistor SWT, the sensing transistor SET, and the driving transistor DT. With reference to FIG. 4, in the A-A' cross-section, the second wiring layer GSS and the active layer ACT may constitute the driving transistor DT and the switching transistor SWT.

The active layer ACT may include a first active layer ACT1, a second active layer ACT2, and a third active layer ACT3. The first active layer ACT1, the second active layer ACT2, and the third active layer ACT3 may be made of the same material. The first active layer ACT1, the second active layer ACT2, and the third active layer ACT3 may be spaced apart from one another.

The first active layer ACT1 may constitute the driving transistor DT and connect the first capacitor C1*a* and a third-first wiring layer CLAD1 corresponding to one end of the third capacitor C3.

The second active layer ACT2 may constitute the switching transistor SWT and electrically connect the data lines DL1, DL2, and DL3 and the gate electrode of the driving transistor DT. One end of the second active layer ACT2 may be connected to the data lines DL1, DL2, and DL3, and the other end of the second active layer ACT2 may be connected to a third-second wiring layer CLAD2. The data voltage provided from the data lines DL1, DL2, and DL3 may be stored in the storage capacitor and then transmitted to the gate electrode of the driving transistor DT through the third-second wiring layer CLAD2.

The third active layer ACT3 may constitute the sensing transistor SET and electrically connect the reference voltage line RVL and the third-first wiring layer CLAD1. The third-first wiring layer CLAD1 may correspond to one end of the first capacitor C1*a* and one end of the third capacitor C3.

One or more insulation layers may be disposed on the active layer ACT. For example, the insulation layers may include a gate insulation layer GI and one or more intermediate insulation layers ILD1 and ILD2. The configurations of one or more insulation layers may vary depending on the stack layout for each of the subpixels. The embodiments of the present disclosure are not limited thereto.

The intermediate electrode layer SD and the third wiring layer CLAD may be disposed on one or more insulation layers. The intermediate electrode layer SD may be disposed between a first intermediate insulation layer ILD1 and a second intermediate insulation layer ILD2, and the third wiring layer CLAD may be disposed on the second intermediate insulation layer ILD2. However, the present disclosure is not limited thereto.

The intermediate electrode layer SD may be disposed to traverse the storage capacitor of the plurality of subpixels SP. For example, the intermediate electrode layer SD may be one electrode layer that traverses an area corresponding to the storage capacitors (the first capacitors C1) of the first to third subpixels SP1, SP2, and SP3.

In the embodiment, the intermediate electrode layer SD may be disposed substantially in parallel with the gate line GL.

Figure 8:
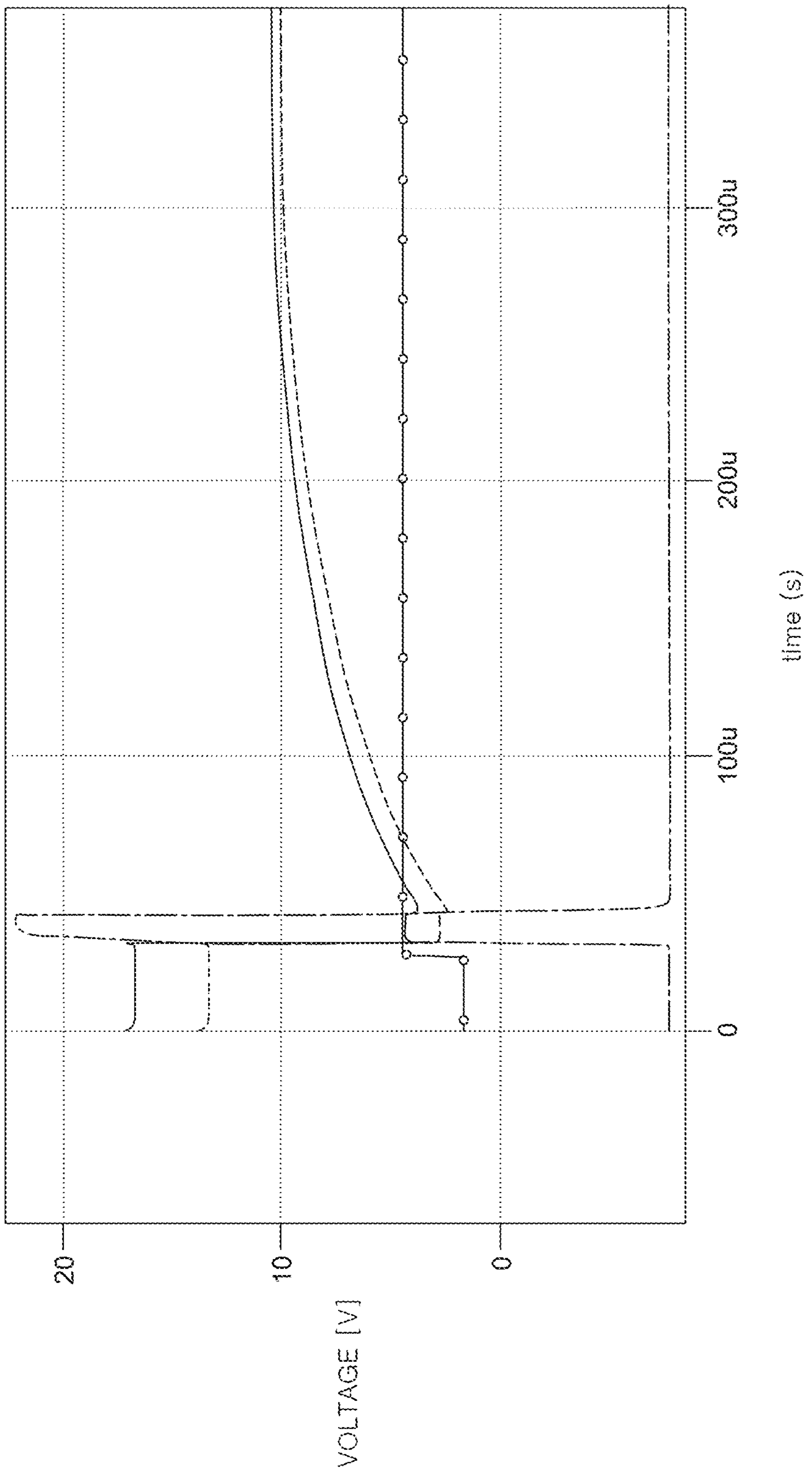
FIG. 8 is a graph for explaining a boosting loss effect.

In the embodiment, the intermediate electrode layer SD may be disposed between the active layer ACT and the third wiring layer CLAD. The intermediate electrode layer SD may define the second capacitor C2 with the active layer ACT and define the third capacitor C3 with the third wiring layer CLAD. The second capacitor C2 and the third capacitor C3 may be a parasitic capacitor. With the second capacitor C2 and the third capacitor C3 (e.g., an increase in number of parasitic capacitors), the boosting phenomenon may be reduced, and the drive current for the subpixels may be reduced even though the gate electrode of the driving transistor DT is charged with voltages at equal levels (see FIG. 8). The decrease in drive current, in turn, may improve overall gradation FOS quality.

In addition, the boosting phenomenon will be further described. In general, when a particular gate line (e.g., an N-th gate line) is deactivated (off) and a next gate line (e.g., an (N+1) th gate line) is activated (on), a high-potential voltage VDD may be applied to the pixels of the N-th gate lines. In this process, the voltages of the gate node and the source node of the driving transistor DT are boosted.

After the occurrence of boosting, the current (drive current) of the pixel is determined by a difference in voltage between the gate node and the source node. The current is a main element for determining luminance of the pixel. A degree of boosting is determined by the capacitor (storage capacitor) applied to the gate node and the source node of the driving transistor DT. In this case, the boosting may be lost by ratios of capacitances between the storage capacitor and other capacitors. This loss may be referred to as a boosting loss. According to the embodiment of the present specification, the boosting loss may be determined by the storage capacitor (e.g., the first capacitor C1) and other capacitors (e.g., the second capacitor C2 and the third capacitor C3).

Additionally, according to the embodiment, a low-current operation may be implemented by an increase in gradation voltage without increasing a channel length of the driving transistor DT. Therefore, a margin for an area for designing the pixel may be increased.

The second wiring layer GSS and the third wiring layer CLAD may be disposed on an insulation layer or disposed between two or more insulation layers. The second wiring layer GSS may be disposed on the gate insulation layer GI, and the third wiring layer CLAD may be disposed on the second intermediate insulation layer ILD2. In detail, the second wiring layer GSS may be disposed between the gate insulation layer GI and the first intermediate insulation layer ILD1, and the third wiring layer CLAD may be disposed on the second intermediate insulation layer ILD2 and covered by a passivation layer PAS.

The second wiring layer GSS may constitute the gate electrodes of the driving transistor DT, the switching transistor SWT, and the sensing transistor SET. For example, the second wiring layer GSS may include a second-first wiring layer GSS1 corresponding to the gate electrode of the driving transistor DT, and a second-second wiring layer GSS2 corresponding to the gate electrode of the sensing transistor SET and the gate electrode of the switching transistor SWT. The second-second wiring layer GSS2 may be the gate line GL or may be formed together with the gate line GL.

The third wiring layer CLAD may define the first-first capacitor C1*a* in the area facing the active layer ACT. The first-first capacitor C1*a* may be configured as a part of the first capacitor C1 corresponding to the storage capacitor. The first capacitor C1 may include the first-first capacitor C1*a* and the first-second capacitor C1*b*, and the capacitance of the first capacitor C1 may be defined by the first-first capacitor C1*a* and the first-second capacitor C1*b*. The storage capacitor in the storage capacitor area may be made by coupling the first-first capacitor C1*a* and the first-second capacitor C1*b*.

The third wiring layer CLAD may include the third-first wiring layer CLAD1, the third-second wiring layer CLAD2, and a third-third wiring layer CLAD3.

The third-first wiring layer CLAD1 may be one end of the first capacitor C1 and one end of the third capacitor C3. One area of the third-first wiring layer CLAD1 may define the third capacitor C3 while facing the intermediate electrode layer SD, and another area of the third-first wiring layer CLAD1 may define the first-first capacitor C1*a* while facing the second active layer ACT2.

The third-second wiring layer CLAD2 may connect the second-first wiring layer GSS1 and the second active layer ACT2. The second-first wiring layer GSS1 may be the gate electrode of the driving transistor DT. The second active layer ACT2 may constitute the first-first capacitor C1*a* with the third-first wiring layer CLAD1 and constitute the second capacitor C2 with the intermediate electrode layer SD.

The third-third wiring layer CLAD3 may connect the second active layer ACT2 and the data line DL. The second-second wiring layer GSS2 may be the gate electrode of the switching transistor SWT. The second-second wiring layer GSS2 may be the gate electrode of the sensing transistor SET. The data voltage may be stored in the storage capacitor C1 through the second active layer ACT2 while the switching transistor SWT is turned on.

The third wiring layer CLAD may further include a third-fourth wiring layer CLAD4. The third-fourth wiring layer CLAD4 may connect the reference voltage line RVL and the third active layer ACT3. In detail, unlike the first subpixel SP1 and the second subpixel SP2, the third subpixel SP3 may be disposed to be distant from the reference voltage line RVL by the dimension of one subpixel. The reference voltage line RVL may supply the reference voltage VREF to the sensing transistor SET of the third subpixel SP3 through the third-fourth wiring layer CLAD4.

The third wiring layer CLAD may define the third capacitor C3 in the area facing the intermediate electrode layer SD. As described above, the third capacitor C3 may be a kind of parasitic capacitor and generate a boosting loss in the storage capacitor area.

According to the embodiment of the present specification, the third wiring layer CLAD may be further disposed at other positions in addition to the third-first to third-fourth wiring layers CLAD1, CLAD2, CLAD3, and CLAD4 and connect different constituent elements. The third wiring layer CLAD is not limited to the above-mentioned wiring layers.

Figure 5:
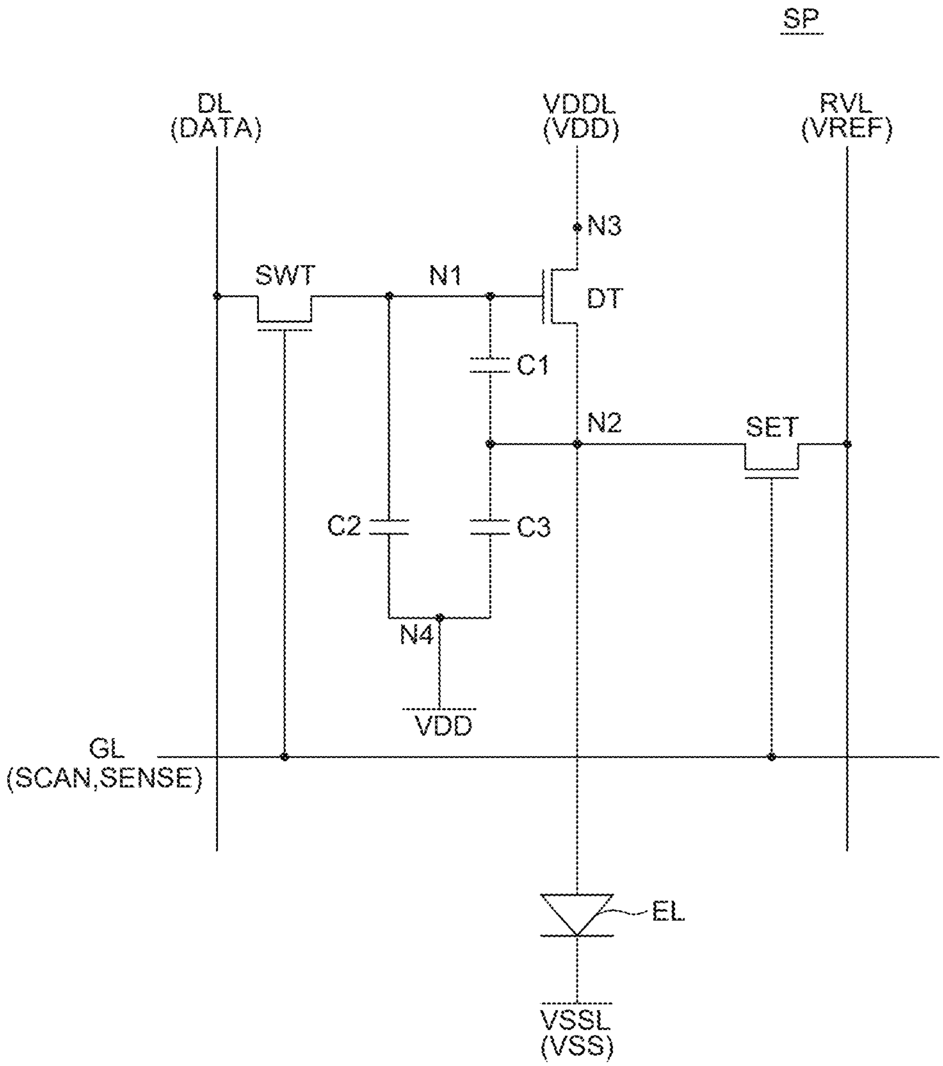
FIG. 5 is a circuit diagram of a subpixel of a display device according to another embodiment of the present disclosure.

FIG. 5 is a circuit diagram of a subpixel of a display device according to another embodiment of the present disclosure.

A display device in FIG. 5 is substantially identical in configuration to the display device in FIG. 2, except that a voltage received by the fourth node N4 in the display device in FIG. 5 is different from the voltage received by the fourth node N4 in the display device in FIG. 2. Therefore, repeated descriptions of the identical components will be omitted. According to the embodiment, the fourth node N4 may receive the high-potential voltage VDD. For example, one end of the intermediate electrode line SD may be connected to the high-potential voltage supply line VDDL, and the intermediate electrode line SD may be disposed to traverse the storage capacitor of the plurality of subpixels SP1, SP2, and SP3. In this case, the second capacitor C2 and the third capacitor C3 may be electrically connected to the high-potential voltage supply line VDDL through the fourth node N4.

Figure 6:
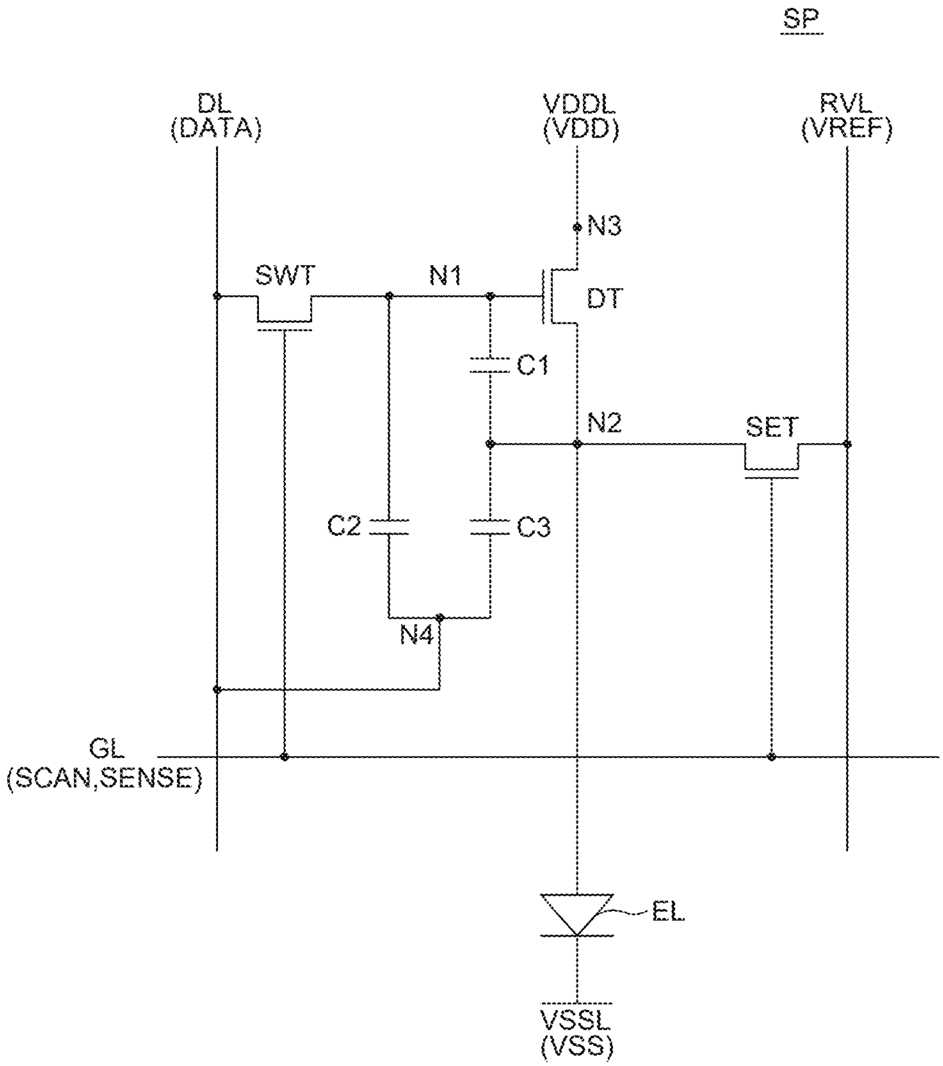
FIG. 6 is a circuit diagram of a subpixel of a display device according to still another embodiment of the present disclosure.

FIG. 6 is a circuit diagram of a subpixel of a display device according to still another embodiment of the present disclosure.

A display device in FIG. 6 is substantially identical in configuration to the display device in FIG. 2, except that a line connected to the fourth node N4 in the display device in FIG. 6 is different from the line connected to the fourth node N4 in the display device in FIG. 2. Therefore, repeated descriptions of the identical components will be omitted. According to the embodiment, the fourth node N4 may be electrically connected to the gate line GL. For example, one end of the intermediate electrode line SD may be connected to the gate line GL, and the intermediate electrode line SD may be disposed to traverse the storage capacitor of the plurality of subpixels SP1, SP2, and SP3. In this case, the second capacitor C2 and the third capacitor C3 may be electrically connected to the gate line GL through the fourth node N4.

Figure 7:
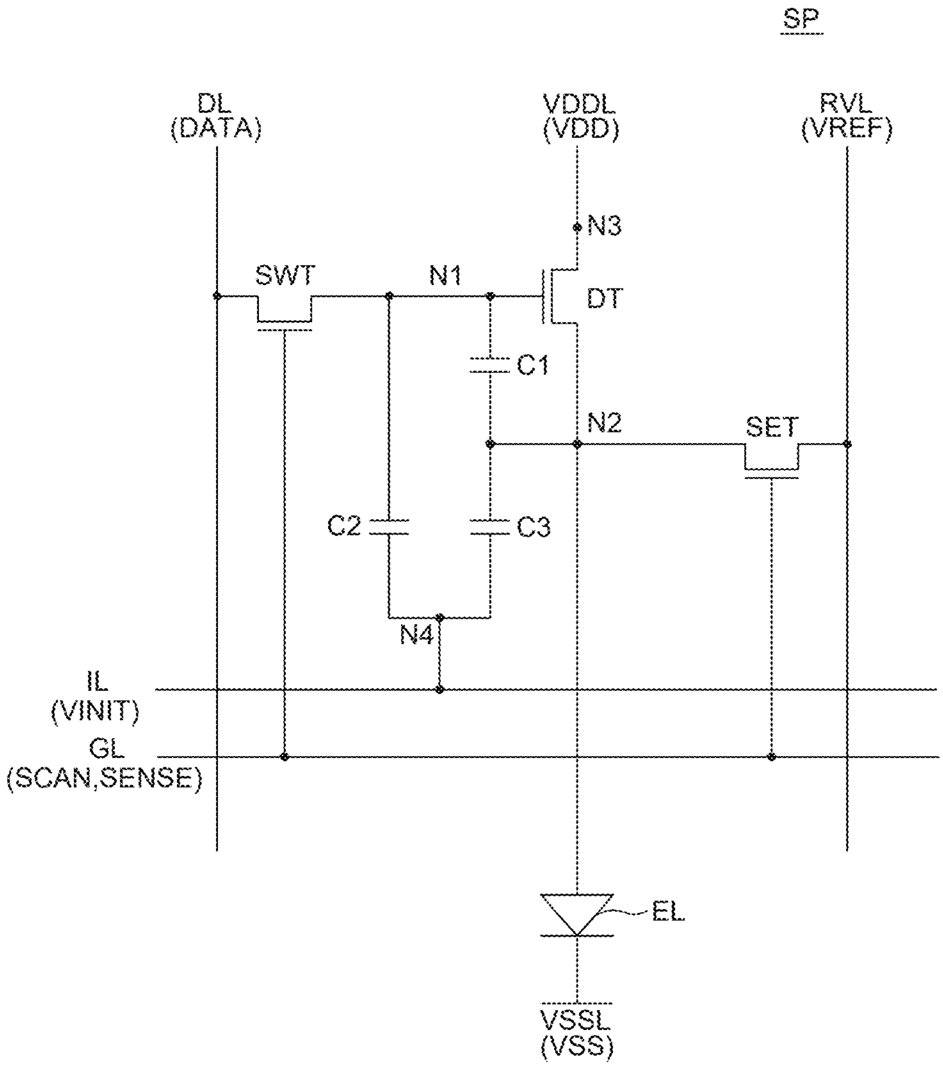
FIG. 7 is a circuit diagram of a subpixel of a display device according to yet another embodiment of the present disclosure.

FIG. 7 is a circuit diagram of a subpixel of a display device according to yet another embodiment of the present disclosure.

A display device in FIG. 7 is substantially identical in configuration to the display device in FIG. 2, except that an initialization line IL is further provided. Therefore, repeated descriptions of the identical components will be omitted. With reference to FIG. 7, the fourth node N4 may be electrically connected to the initialization line IL. For example, one end of the intermediate electrode line SD may be connected to the initialization line IL, and the intermediate electrode line SD may be disposed to traverse the storage capacitor of the plurality of subpixels SP1, SP2, and SP3. In this case, the second capacitor C2 and the third capacitor C3 may be electrically connected to the initialization line IL through the fourth node N4. For reference, the initialization line IL may supply an initialization voltage VINIT.

The exemplary embodiments of the present disclosure can also be described as follows:

A display device according to an embodiment of the present disclosure may comprise a plurality of subpixels, in which the plurality of subpixels each includes: a driving transistor configured to operate a light-emitting element by receiving a data voltage; a switching transistor configured to apply the data voltage to a gate electrode of the driving transistor; the light-emitting element including a cathode and an anode, the anode being connected to a source electrode of the driving transistor, the cathode being electrically connected to a low-potential voltage supply line, in which the low-potential voltage supply line may be electrically connected to an intermediate electrode line that traverses a storage capacitor of the subpixels, in which the low-potential voltage supply line supplies a low-potential voltage to the light-emitting element, and in which the intermediate electrode line composes a first parasitic capacitor with the gate electrode of the driving transistor and composes a second parasitic capacitor with the source electrode of the driving transistor.

The storage capacitor may be formed between the gate electrode and the source electrode of the driving transistor, and the intermediate electrode line may traverse the storage capacitor corresponding to a storage capacitor area.

The display device may further comprise a high-potential voltage supply line, wherein the gate electrode of the driving transistor may be connected to a source electrode of a switching transistor, a drain electrode of the driving transistor may be connected to the high-potential voltage supply line, and the source electrode of the driving transistor may be connected to the anode of the light-emitting element.

The intermediate electrode line may be disposed from the low-potential voltage supply line without intersecting the high-potential voltage supply line.

The display device may further comprise a gate line configured to supply a scan signal or a sensing signal; and a data line configured to supply the data voltage, wherein a gate electrode of the switching transistor may be connected to the gate line, a drain electrode of the switching transistor may be connected to the data line, and a source electrode of the switching transistor may be connected to the gate electrode of the driving transistor.

The intermediate electrode line may be disposed in parallel with the gate line.

A group of the plurality of subpixels may compose one pixel, and the intermediate electrode line may be disposed to intersect a plurality of data lines included in one pixel.

The plurality of subpixels may comprise a first subpixel, a second subpixel, and a third subpixel, wherein the plurality of data lines may comprise a first data line for the first subpixel, a second data line for the second subpixel, and a third data line for the third subpixel, and wherein a reference voltage line may be disposed between the first subpixel and the second subpixel and may supply a reference voltage to the first to third subpixels.

The intermediate electrode line may be disposed to intersect the reference voltage line.

The display device may further comprise a sensing transistor configured to control a voltage state of the source electrode of the driving transistor, wherein the sensing transistor may be connected between the source electrode of the driving transistor and a reference voltage line configured to supply a reference voltage, and a gate electrode of the sensing transistor may be connected to the gate line.

The display device may further comprise a first wiring layer, an active layer, a second wiring layer, an intermediate electrode layer, and a third wiring layer sequentially disposed on a substrate, wherein the storage capacitor in the storage capacitor area may be made by coupling a first-first capacitor, which may be formed between the third wiring layer and the active layer, and a first-second capacitor formed between the first wiring layer and the active layer.

The first wiring layer may be formed together with a high-potential voltage supply line, the low-potential voltage supply line, a data line, and a reference voltage line.

The active layer may be a semiconductor layer for a plurality of transistors including a driving transistor.

The second wiring layer may be formed together with a gate line.

The third wiring layer may electrically connect the first wiring layer, the second wiring layer, the intermediate electrode layer, and the active layer through a plurality of contact holes.

The first parasitic capacitor may be formed between the active layer and the intermediate electrode layer in the storage capacitor area.

The second parasitic capacitor may be formed between the intermediate electrode layer and the third wiring layer in the storage capacitor area.

A pixel circuit according to an embodiment of the present disclosure may comprise a light-emitting element; a driving transistor configured to operate the light-emitting element by receiving a data voltage; and a switching transistor configured to apply the data voltage to a gate electrode of the driving transistor, wherein the light-emitting element may comprise a cathode and an anode, wherein the anode may be connected to a source electrode of the driving transistor, wherein the cathode may be connected to a low-potential voltage supply line, wherein the low-potential voltage supply line may be electrically connected to an intermediate electrode line that traverses a storage capacitor of subpixels, wherein the low-potential voltage supply line supplies a low-potential voltage to the light-emitting element, and wherein the intermediate electrode line composes a first parasitic capacitor with the gate electrode of the driving transistor and composes a second parasitic capacitor with the source electrode of the driving transistor.

The storage capacitor may be formed between the gate electrode and the source electrode of the driving transistor, and the intermediate electrode line may traverse the storage capacitor corresponding to a storage capacitor area.

The pixel circuit may further comprise a high-potential voltage supply line, wherein the gate electrode of the driving transistor may be connected to a source electrode of a switching transistor, a drain electrode of the driving transistor may be connected to the high-potential voltage supply line, and the source electrode of the driving transistor may be connected to the anode of the light-emitting element.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A display device comprising:

a plurality of subpixels; and an intermediate electrode line traversing storage capacitors in storage capacitor areas of the plurality of subpixels, wherein each of the plurality of subpixels includes:

a light-emitting element including a cathode and an anode;

a driving transistor configured to operate the light-emitting element by receiving a data voltage;

a switching transistor configured to apply the data voltage to a gate electrode of the driving transistor;

a storage capacitor having a first end connected to the gate electrode of the driving transistor and a second end connected to a source electrode of the driving transistor;

a first parasitic capacitor having a first end connected to the gate electrode of the driving transistor and to the first end of the storage capacitor; and a second parasitic capacitor having a first end connected to the source electrode of the driving transistor and to the second end of the storage capacitor, wherein the anode is connected to the source electrode of the driving transistor, wherein the cathode is connected to a low-potential voltage supply line, wherein the low-potential voltage supply line supplies a low-potential voltage to the light-emitting element, wherein a second end of the first parasitic capacitor is connected to a second end of the second parasitic capacitor, wherein the storage capacitor includes a first layer and a second layer forming a capacitor, wherein the intermediate electrode line passes between the first layer and the second layer of the storage capacitor, and wherein the intermediate electrode line composes the first parasitic capacitor with the gate electrode of the driving transistor and composes the second parasitic capacitor with the source electrode of the driving transistor.

2. The display device of claim 1, wherein the low-potential voltage supply line is electrically connected to the intermediate electrode line.

3. The display device of claim 1, wherein the first parasitic capacitor and the second parasitic capacitor are electrically connected to a high-potential voltage supply line.

4. The display device of claim 1, wherein the first parasitic capacitor and the second parasitic capacitor are electrically connected to a gate line configured to supply a scan signal or a sensing signal.

5. The display device of claim 1, wherein the first parasitic capacitor and the second parasitic capacitor are electrically connected to an initialization line configured to supply an initialization voltage.

6. The display device of claim 1, further comprising:

a high-potential voltage supply line, wherein the gate electrode of the driving transistor is connected to a source electrode of a switching transistor, a drain electrode of the driving transistor is connected to the high-potential voltage supply line, and the source electrode of the driving transistor is connected to the anode of the light-emitting element.

7. The display device of claim 6, wherein the intermediate electrode line is disposed from the low-potential voltage supply line without intersecting the high-potential voltage supply line.

8. The display device of claim 1, further comprising:

a gate line configured to supply a scan signal or a sensing signal; and a data line configured to supply the data voltage, wherein a gate electrode of the switching transistor is connected to the gate line, a drain electrode of the switching transistor is connected to the data line, and a source electrode of the switching transistor is connected to the gate electrode of the driving transistor.

9. The display device of claim 8, wherein the intermediate electrode line is in parallel with the gate line.

10. The display device of claim 8, wherein a group of the plurality of subpixels composes one pixel, and the intermediate electrode line intersects a plurality of data lines included in the one pixel.

11. The display device of claim 10, wherein the plurality of subpixels comprise a first subpixel, a second subpixel, and a third subpixel, wherein the plurality of data lines comprise a first data line for the first subpixel, a second data line for the second subpixel, and a third data line for the third subpixel, and wherein a reference voltage line is between the first subpixel and the second subpixel and supplies a reference voltage to the first subpixel to the third subpixel.

12. The display device of claim 11, wherein the intermediate electrode line intersects the reference voltage line.

13. The display device of claim 11, wherein the third subpixel is spaced apart from the reference voltage line by a dimension of one subpixel.

14. The display device of claim 8, further comprising:

a sensing transistor configured to control a voltage state of the source electrode of the driving transistor, wherein the sensing transistor is connected to the source electrode of the driving transistor and a reference voltage line that is configured to supply a reference voltage, and a gate electrode of the sensing transistor is connected to the gate line.

15. The display device of claim 1, further comprising:

a first wiring layer, an active layer, a second wiring layer, an intermediate electrode layer, and a third wiring layer sequentially disposed on a substrate, wherein the storage capacitor in a storage capacitor area is made by coupling a first-first capacitor that is between the third wiring layer and the active layer, and a first-second capacitor that is between the first wiring layer and the active layer.

16. The display device of claim 15, wherein the first wiring layer is formed together with a high-potential voltage supply line, the low-potential voltage supply line, a data line, and a reference voltage line.

17. The display device of claim 15, wherein the active layer is a semiconductor layer for a plurality of transistors including a driving transistor.

18. The display device of claim 15, wherein the second wiring layer is formed together with a gate line.

19. The display device of claim 15, wherein the third wiring layer electrically connects the first wiring layer, the second wiring layer, the intermediate electrode layer, and the active layer through a plurality of contact holes.

20. The display device of claim 15, wherein the first parasitic capacitor is formed between the active layer and the intermediate electrode layer in the storage capacitor area.

21. The display device of claim 15, wherein the second parasitic capacitor is formed between the intermediate electrode layer and the third wiring layer in the storage capacitor area.

22. The display device of claim 15, wherein the intermediate electrode layer is between a first intermediate insulation layer and a second intermediate insulation layer.

23. The display device of claim 22, wherein the second wiring layer is between a gate insulation layer and the first intermediate insulation layer, and the third wiring layer is on the second intermediate insulation layer and covered by a passivation layer.

24. A pixel circuit comprising:

a light-emitting element including a cathode and an anode;

a driving transistor configured to operate the light-emitting element by receiving a data voltage;

a switching transistor configured to apply the data voltage to a gate electrode of the driving transistor;

a storage capacitor having a first end connected to the gate electrode of the driving transistor and a second end connected to a source electrode of the driving transistor;

an intermediate electrode line traversing the storage capacitor in a storage capacitor area;

a first parasitic capacitor having a first end connected to the gate electrode of the driving transistor and to the first end of the storage capacitor; and a second parasitic capacitor having a first end connected to the source electrode of the driving transistor and to the second end of the storage capacitor, wherein the light-emitting element comprises a cathode and an anode, wherein the anode is connected to a source electrode of the driving transistor, wherein the cathode is connected to a low-potential voltage supply line that supplies a low-potential voltage to the light-emitting element, wherein a second end of the first parasitic capacitor is connected to a second end of the second parasitic capacitor, wherein the storage capacitor includes a first layer and a second layer forming a capacitor, wherein the intermediate electrode line passes between the first layer and the second layer of the storage capacitor, and wherein the intermediate electrode line composes the first parasitic capacitor with the gate electrode of the driving transistor and composes the second parasitic capacitor with the source electrode of the driving transistor.

25. The pixel circuit of claim 24, wherein the low-potential voltage supply line is electrically connected to the intermediate electrode line.

26. The pixel circuit of claim 24, wherein the first parasitic capacitor and the second parasitic capacitor are electrically connected to a high-potential voltage supply line.

27. The pixel circuit of claim 24, wherein the first parasitic capacitor and the second parasitic capacitor are electrically to a gate line that is configured to supply a scan signal or a sensing signal.

28. The pixel circuit of claim 24, wherein the first parasitic capacitor and the second parasitic capacitor are electrically connected to an initialization line that is configured to supply an initialization voltage.

29. The pixel circuit of claim 24, further comprising:

a high-potential voltage supply line, wherein the gate electrode of the driving transistor is connected to a source electrode of a switching transistor, a drain electrode of the driving transistor is connected to the high-potential voltage supply line, and the source electrode of the driving transistor is connected to the anode of the light-emitting element.

30. The pixel circuit of claim 24, wherein the storage capacitor comprises a first-first capacitor between the gate electrode and the source electrode of the driving transistor, and a first-second capacitor between the source electrode of the driving transistor and the low-potential voltage supply line.

* * * * *